United States Patent
Jacob et al.

(10) Patent No.: US 10,132,565 B2
(45) Date of Patent: Nov. 20, 2018

(54) ROTARY DRYER STAR AND METHOD FOR TREATING SOLID PARTICLES

(71) Applicant: Glatt Ingenieurtechnik GmbH, Weimar (DE)

(72) Inventors: Michael Jacob, Weimar (DE); Reinhard Boeber, Weimar (DE); Raoul Pila, Bad Bellingen (DE); Heinz Pritzke, Braunsdorf (DE)

(73) Assignee: Glatt Ingenieurtechnik GmbH, Welmar (DE)

( * ) Notice: Subject to any disclaimer, the term of this patent is extended or adjusted under 35 U.S.C. 154(b) by 264 days.

(21) Appl. No.: 14/781,979

(22) PCT Filed: Apr. 3, 2014

(86) PCT No.: PCT/DE2014/000162
§ 371 (c)(1),
(2) Date: Oct. 2, 2015

(87) PCT Pub. No.: WO2014/161525
PCT Pub. Date: Oct. 9, 2014

(65) Prior Publication Data
US 2016/0047599 A1    Feb. 18, 2016

(30) Foreign Application Priority Data
Apr. 3, 2013   (DE) .................. 10 2013 005 920

(51) Int. Cl.
*F26B 3/00* (2006.01)
*F26B 11/02* (2006.01)
(Continued)

(52) U.S. Cl.
CPC .............. *F26B 11/028* (2013.01); *B01J 2/16* (2013.01); *B01J 8/38* (2013.01); *B01J 8/44* (2013.01);
(Continued)

(58) Field of Classification Search
CPC ..... B01J 8/44; B01J 8/00; B01J 8/0015; B01J 8/08; B01J 8/18; B01J 8/1818;
(Continued)

(56) References Cited

U.S. PATENT DOCUMENTS

| 3,311,993 A * | 4/1967 | Bersano ................ B29B 13/021 |
| | | 34/187 |
| 3,724,090 A | 4/1973 | Smith, Jr. |

(Continued)

FOREIGN PATENT DOCUMENTS

| AT | 220 075 B | 3/1962 |
| AT | 252874 B | 3/1967 |

(Continued)

OTHER PUBLICATIONS

International Search Report of PCT/DE2014/000162, dated Feb. 2, 2015.
(Continued)

*Primary Examiner* — John McCormack
(74) *Attorney, Agent, or Firm* — Collard & Roe, P.C.

(57) ABSTRACT

The invention is based on a star-shaped rotation dryer (1) for segmenting a fluidizing chamber 4) into process compartments (11), whereby the star-shaped rotation dryer (1) is pivot mounted and features dividing wall (9) or similar for the conveyance of solid particles along a conveyance path, whereby a flow-receiving base (10) is detachably mounted below the star-shaped rotation dryer (1); the invention further relates to a method of spray-coating solid particles for the purpose of agglomeration, coating, layering, spray granulation or pelletization, whereby the retention time spectrum of the solid particles inside the fluid-bed apparatus (2) has a margin of at least 1:3 (alternatively tRTD90≤3 tRTD10).

10 Claims, 9 Drawing Sheets

(51) Int. Cl.
*B01J 8/38* (2006.01)
*B01J 8/44* (2006.01)
*F26B 7/00* (2006.01)
*F26B 17/10* (2006.01)
*B01J 2/16* (2006.01)
*B01J 2/00* (2006.01)

(52) U.S. Cl.
CPC ............ *F26B 7/007* (2013.01); *F26B 17/104* (2013.01); *B01J 2/006* (2013.01); *B01J 2208/00557* (2013.01)

(58) Field of Classification Search
CPC . B01J 8/2222; B01J 8/2226; B01J 8/36; B01J 8/38; B01J 2/006; B01J 2208/00884; B01J 2208/00557; B01J 2208/0092; B01F 3/06; B01F 7/16; B01F 7/007; F26B 17/18; F26B 17/104; F26B 11/028
USPC .................. 34/179, 323, 357, 579, 587, 589
See application file for complete search history.

(56) References Cited

U.S. PATENT DOCUMENTS

| | | | |
|---|---|---|---|
| 4,096,792 | A | 6/1978 | Smith, Jr. |
| 4,246,836 | A | 1/1981 | Smith, Jr. |
| 4,425,865 | A * | 1/1984 | Horner ............... B01J 2/006 118/19 |
| 4,426,936 | A | 1/1984 | Kuo |
| 4,511,093 | A | 4/1985 | Ohkoshi et al. |
| 5,199,184 | A | 4/1993 | Rosse |
| 5,648,118 | A | 7/1997 | Liborius |
| 2003/0190417 | A1 | 10/2003 | Takei et al. |
| 2008/0203200 | A1 | 8/2008 | Waldron et al. |
| 2008/0299305 | A1 | 12/2008 | Bedetti |
| 2010/0095886 | A1 | 4/2010 | Bedetti |
| 2011/0180157 | A1 * | 7/2011 | Fusejima ............... B01J 8/1818 137/343 |
| 2014/0283739 | A1 | 9/2014 | Bedetti |
| 2014/0310980 | A1 | 10/2014 | Jacob et al. |
| 2014/0318444 | A1 | 10/2014 | Bedetti |

FOREIGN PATENT DOCUMENTS

| | | |
|---|---|---|
| AT | 331 189 B | 8/1976 |
| DE | 1 227 840 B | 10/1966 |
| DE | 29 04 077 A1 | 11/1979 |
| DE | 30 02 610 A1 | 8/1980 |
| DE | 236 159 A1 | 5/1986 |
| DE | 35 19 750 C2 | 6/1988 |
| DE | 29 04 121 C2 | 7/1988 |
| DE | 197 06 434 A1 | 8/1998 |
| DE | 20 2010 011 968 U1 | 12/2010 |
| EP | 0 965 279 A2 | 12/1999 |
| EP | 1 584 371 A1 | 10/2005 |
| GB | 1 059 077 A | 2/1967 |
| GB | 1 072 908 A | 6/1967 |
| JP | H03-500501 A | 2/1991 |
| JP | H03-284343 A | 12/1991 |
| JP | H05-70639 A | 9/1993 |
| JP | H07 265683 A | 10/1995 |
| JP | H08 29057 A | 2/1996 |
| WO | 2006/067544 A1 | 6/2006 |
| WO | 2007/124745 A1 | 11/2007 |

OTHER PUBLICATIONS

International Search Report of PCT/DE2014/000163, dated Sep. 5, 2014.

* cited by examiner

ROTARY DRYER STAR AND METHOD FOR TREATING SOLID PARTICLES

STATE OF THE ART

Cross Reference to Related Applications

This application is the National Stage of PCT/DE2014/000162 filed on Apr. 3, 2014, which claims priority under 35 U.S.C. § 119 of German Application No. 10 2013 005 920.8 filed on Apr. 3, 2013, the disclosure of which is incorporated by reference. The international application under PCT article 21(2) was not published in English.

The invention is based on a star-shaped rotation dryer for segmenting a fluidizing chamber into process compartments, and a process for the treatment of solid particles.

Continuously operating fluid-bed apparatuses for conditioning solid particles with a star-shaped rotation dryer rotating around a vertical central axis in a fluidizing chamber, the latter thereby being segmented into process compartments, have long been state of the art. The special benefit of using a star-shaped rotation dryer rotating around a vertical central axis is that the solid particles will remain inside the fluidizing chamber for a set time that can be precisely defined.

Patent specification DE-PS 1 227 840 B introduces a continuously operating fluid-bed dryer for free-flowing products. Said fluid-bed dryer consists of a shaft-like drying room, a perforated base to admit a flow of gaseous drying agents, and radial walls rotating in the drying room above the perforated base around a shaft axis, said walls extending to the shaft jacket over the whole height thereof. The upwardly widening shaft jacket interlocks at each end with the respective adjoining parts, thereby sealing the connections, namely at the top, with a stationary filter and feed chamber connected to the shaft, and below the perforated base, with an air chamber. The radial walls are firmly fixed to the shaft jacket. The disadvantage of the technical solution disclosed in this patent specification is that any solid particles not yet fully fluidized will sink or fall onto the perforated base where they can be destroyed by the radial walls rotating around a shaft axis, resulting in a reduced product yield.

Patent specification AT 252874 B describes a fluid-bed facility for the continuous performance of chemical reactions and/or of physical/chemical operations with a time-controllable throughput of the reagent to be processed. For this purpose, each compartment of the fluidizing chamber, i.e. the reaction chamber, is fitted with a horizontal hollow shaft, featuring arms and openings, where below the reaction or fluidizing chamber, there is a chamber for distributing the incoming medium, said distribution chamber being composed of several compartments or segments, with each separate compartment or segment being fitted with a gas feed line featuring a device for regulating and/or interrupting the inflow of the reaction medium, if necessary, swirled medium. The disadvantage must again be seen in the fact that incompletely fluidized solid particles sink or fall onto the perforated base, located between the fluidizing chamber and the distribution chamber, and that the radial walls rotating around a shaft axis can destroy the solid particles.

The Invention and its Advantages

By comparison, the invention-based star-shaped rotation dryer for segmenting a fluidizing chamber into process compartments has the advantage that a flow-receiving base is detachably mounted below the star-shaped rotation dryer. The star-shaped rotation dryer is pivot-mounted inside the fluidizing chamber and it features dividing walls or similar for the conveyance of solid particles along a conveyance path. Because of the detachable mounting of a flow-receiving base, e.g. designed as a grid, below the star-shaped rotation dryer, the disadvantages revealed in prior art are overcome. Any solid particles not yet fully fluidised can sink or fall onto the perforated base where they will not be destroyed, instead they are subjected to and conditioned by the flow of a fluidizing medium, e.g. air, or inert gas. In addition, the detachable mounting facilitates easy replacement at any chosen time, so that the flow-receiving base can be adapted to the respective circumstances of the conditioning process. The invention-based device is moreover suitable for the execution of all kinds of granulation and coating processes.

According to an advantageous configuration of the invention-based star-shaped rotation dryer, the size of the holes in the flow-receiving base depends on the solid particles to be conditioned. Said holes are adapted to the respective conditioning circumstances. In the case of different processes, this avoids a destruction of the reagents while being processed.

According to a respectively advantageous configuration of the invention-based star-shaped rotation dryer, said holes feature dimensions that depend on the smallest solid particles found in the conditioning process.

According to another advantageous configuration of the star-shaped rotation dryer of the invention, said star-shaped rotation dryer is fitted with at least one nozzle or similar. Arranging a nozzle on the rotating dryer star offers the possibility of conditioning the solid particles in many different ways while they reside inside the fluidizing chamber. Liquids can, for example, be sprayed on, or different gases be admixed in order to alter or to condition the solid particles. Moreover, even plastics can be sprayed onto the solid particles by means of nozzles for solids. As for positioning, the nozzles can be fitted in the outer wall of the fluidizing chamber or on the rotating dryer star. It is essential for all processing variations that fluid is supplied to the process compartments via the nozzles, e.g. spray nozzles. The medium, e.g. a fluid, can be injected via the nozzle as a solution, suspension, dispersion, emulsion, molten mass etc. In each case, at least one solid particle will be continuously supplied via a solids feeding unit of optional design. The solids retained in the separate process compartments will then be moistened with a medium, e.g. a fluid, via a nozzle. Depending on the prevailing processing circumstances and the product qualities of the solid particles and of the medium, the fluidized particles will then be moistened. Simultaneously, a solidification process will take place in the process compartments, as a result of which the solids will be either combined with one another (agglomeration process), or the solids introduced by the injected fluids will accumulate on the particle surfaces (coating, layering, spray granulation, pelletization). The solvents such as water or organic solvents (ethanol, isopropyl or similar) supplied via the sprayed fluid will evaporate and be discharged with the fluidizing agents (air, nitrogen or similar).

In this way, a multitude of process variations can be carried out for the production or functionalising of particle systems. For example, a powdery (finely dispersed) pharmaceutically active agent (e.g. Paracetamol), produced by crystallization, can be delivered continuously and be sprayed with a watery binding agent (e.g. starchy adhesive). The application of binder leads to an agglomeration of the powder and the development of free flowing agglomerates of a defined structure. The invention-based device facilitates that the final product has an accurately defined content of binding agent. It is moreover possible to achieve a very even and reproducible adjustment of the final moisture content as, compared with continuous granulators of conventional design, there is no inhomogeneity through the retention time spectres.

Continuous coating represents another application variation. It means that a coating is applied to pre-granulated, tabletted or pelletized raw materials (granules, agglomerates, pellets, tablets etc.). An example would be the coating of fertiliser granules or detergent components with damp-resistant barriers (hydrophobing), the coating of carrier pellets with active pharmaceutical agents (drug layering), functional coating of pharmaceutically active agents with e.g. polymers to alter the release profile (SR-coating) or the coating of enzyme granules with additives to improve the stability of storage and of pelletizing.

In all application cases, the invention-based device facilitates the injection of media, e.g. liquids of any kind using all of the known spray devices (e.g. pressure jets, dual-fluid nozzles, ultrasonic nozzles or others), irrespective of the spatial orientation and the positioning (injection from above, below, on the incline, tangential or similar). The number of spray devices is likewise variable. For example, it would be possible to inject different fluids simultaneously via several nozzles into each individual process compartment, or to use multi-substance nozzles (parallel spraying of fluids).

From the point of view of equipment technology, it is also possible for a process compartment being successively supplied with several fluids while moving from the solid particles inlet unit to the solid particles outlet unit. This also facilitates an accurately controlled and regulated composition of e.g. multi-layer pellets. It simply needs the nozzles to be controllably connected to several supply systems.

According to another advantageous configuration of the star-shaped rotation dryer of the invention, the dividing walls that serve to convey the solid particles along a conveying path are firmly fixed to an outer jacket of the fluidizing chamber.

According to a further advantageous configuration of the invention-based star-shaped rotation dryer, at least one process compartment features a top cover and/or at least one filter. Using a cover above the rotation dryer star means that the process compartment is closed at the top. This avoids any spillage of fluidised solid particles from one process compartment to another during operation of the fluid-bed apparatus, whereby the product is improved, as any reverse mixing of solid particles, which have undergone different conditioning processes, between individual process compartments is prevented.

According to a respective advantageous configuration of the invention-based star-shaped rotation dryer, at least one filter is fitted in the cover, of which there is at least one. Arranging the filter in the cover of the process compartment has the advantage that said filter will prevent any fluidized solid particles to be carried out of the respective process compartment and thereby getting into other segments. It also prevents any segregation effects or separations within the segmented process compartments.

According to a further advantageous configuration of the invention-based star-shaped rotation dryer, at least one process compartment features a control unit for the processing gas. This is beneficially fitted above the rotating dryer star and a first cover, so that the flow of the processing gas can be regulated separately for each process compartment. The control unit for the processing gas consists, firstly, of an additional star (filter compartments) for segmenting the process gas flowing through the process compartments and coming out of the cover. Above the star-shaped component there is, secondly and advantageously, a regulating valve or similar for controlling the flow of the processing gas in each process compartment. The advantage is that the flow of processing gas through each process compartment can be parameterized separately in this way or, if required, additionally or alternatively to the air distribution through the flow-receiving base structure. This represents an improvement over the current state of the art, since conditioning by means of the nozzles fitted in each process compartment during one rotation requires differing currents of processing gas. Besides, regulating the flow of processing gas can have positive effects, especially during filling and evacuation of the respective process compartments.

The invention-based method for the treatment of solid particles for the purpose of agglomeration, coating, layering, spray granulation or pelletization has the advantage that the invention-related retention time spectrum as a ratio of the retention time of the solid particles in the fluid-bed apparatus (2) is adjusted to be very narrow during spray application, with a 10% cumulative distribution and 90% cumulative distribution, for example, $t_{RTD}, 90/t_{RTD}, 10 \leq 3$, i.e. the 90% cumulative distribution, is, at maximum, 3 times the value of the 10% cumulative distribution. The advantage of a method with such a narrow retention time spectrum is that the product quality is markedly improved compared with methods with greater ratios of retention time spectra. It is impossible to achieve such narrow time spectra in e.g. devices of traditional design. In the pharmaceutical industry, coating processes are customarily carried out in batch apparatuses to ensure precisely defined coating times and thus layer structures. Continuous coating in classical fluid-bed channels is not suitable for multi-layer coating, since no sufficiently narrow retention time spectrum can be achieved, despite the use of weir constructions. Such a narrow retention time spectrum is however essential, in particular if thin layers are to be applied to solid particles or if a very even covering of the solid particles is required, irrespective of whether treatment is done in one layer or several layers. In equipment of conventional design, it is not possible to achieve e.g.

$t_{RTD}, 90=2$ tRTD, 10 where $t_{RTD}, \ldots$ retention time (10% and 90% values, respectively, of the cumulative distribution).

In said equipment of conventional design, it would only be possible, in an ideal case, to achieve retention time distributions that are equivalent to a step range of 5 to 15 steps of a theoretical stirred-reactor cascade. A retention time spectrum as specified above is thus impossible to achieve with apparatuses of conventional design.

In a continuously operating apparatus, the retention time spectrum cannot be adjusted by optimising the flow profile independent of procedural parameters. There are always interdependencies, e.g. dependence on the throughput, on the fluidizing speed, on the layer mass, as well as on the particle size and density.

A directly adjustable time distribution can only be ensured by restricted accessibility and an exclusion of cross flows. The new concept offers the possibility of predetermining the retention time independent of any procedural or substance-related parameters. In the present case, the retention time can be defined directly via the speed of rotation and thus the exact retention and processing times can be specified. Optimum traceability of the process sequence is thereby ensured, as is required for the processes of coating, agglomeration and spray granulation.

According to a further advantageous configuration of the invention-based method, the device employed for spray coating the solid particles is a star-shaped rotation dryer as described herein.

Further advantages and configurations of the invention can be derived from the description following hereinafter, as well as from the claims and the drawings.

DRAWINGS

Preferred exemplary embodiments of the invention-based object are illustrated in the drawings as explained in more detail below. The drawings show.

DESCRIPTION OF THE EXEMPLARY EMBODIMENTS

Figure 1:
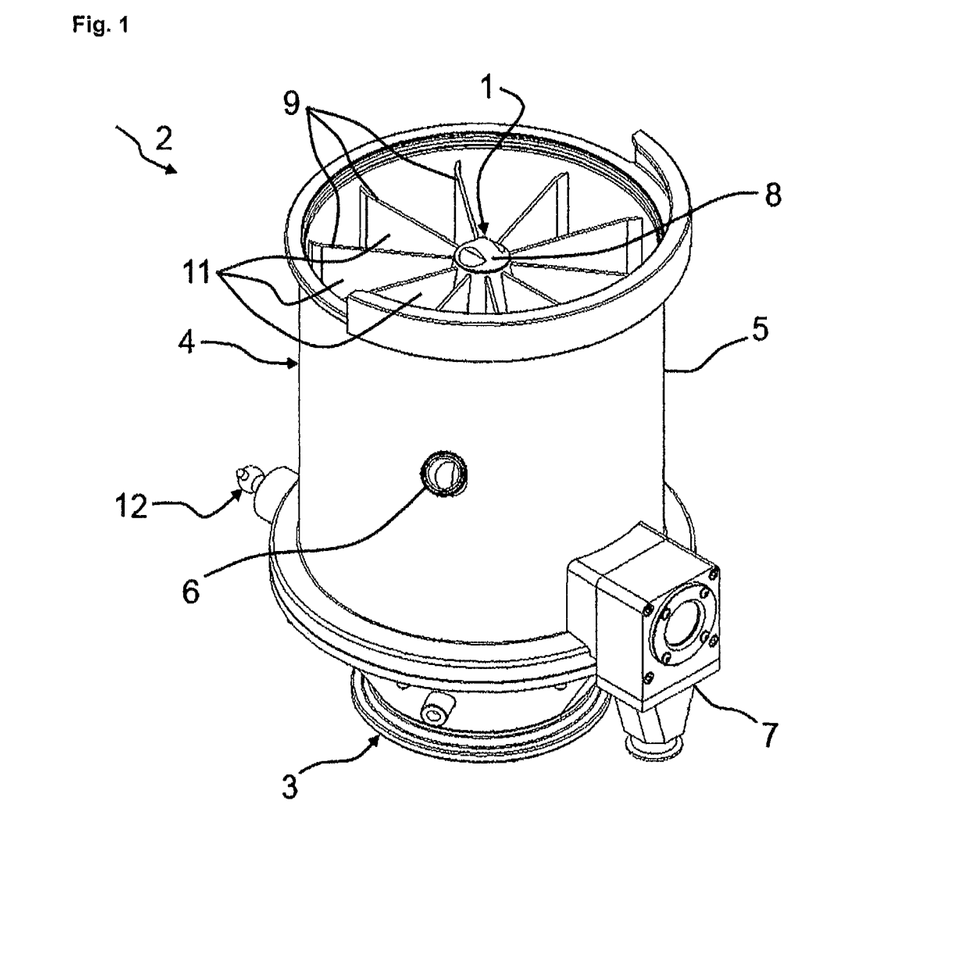
FIG. 1 a perspective representation of a fluid-bed apparatus with incorporated invention-based star-shaped rotation dryer, FIG. 2 a perspective top representation of a fluid-bed apparatus with incorporated invention-based star-shaped rotation dryer, FIG. 3 a cut-away perspective representation of a fluid-bed apparatus with incorporated invention-based star-shaped rotation dryer, FIG. 4 a perspective view of the invention-based star-shaped rotation dryer, FIG. 5 a top view of the invention-based star-shaped rotation dryer, FIG. 6 a perspective representation of the assembly of the invention-based star-shaped rotation dryer and of a mounting part in the distribution chamber.

FIG. 1 shows, in an exemplary embodiment, a perspective view of the invention-based star-shaped rotation dryer 1 incorporated in a fluid-bed apparatus 2. The fluidizing chamber 4 fitted above the distribution chamber 3 consists of an outer jacket 5 featuring a solid particles inlet unit and a solid particles outlet unit 7, and of the invention-based star-shaped rotation dryer 1 rotating inside the fluidizing chamber 4, and featuring a centre cone 8 and, arranged around said cone 8, dividing walls 9 made of e.g. tin, aluminium or similar material and dividing the fluidizing chamber 4 into segments. Said dividing walls 9 extend over the whole height of the fluidizing chamber 4. The dividing walls 9, the external jacket 5, the flow-receiving base 10 not shown, e.g. a metal grid, of the star-shaped rotation dryer 1, as well as a cover, likewise not shown, for the fluidizing chamber 4 form the process compartments 11. A drive unit 12, e.g. a servo motor or similar, generates the rotation of the invention-based dryer star 1, whereby one rotation sets the accurately defined retention time of the solid particles inside the fluidizing chamber 4.

Figure 2:
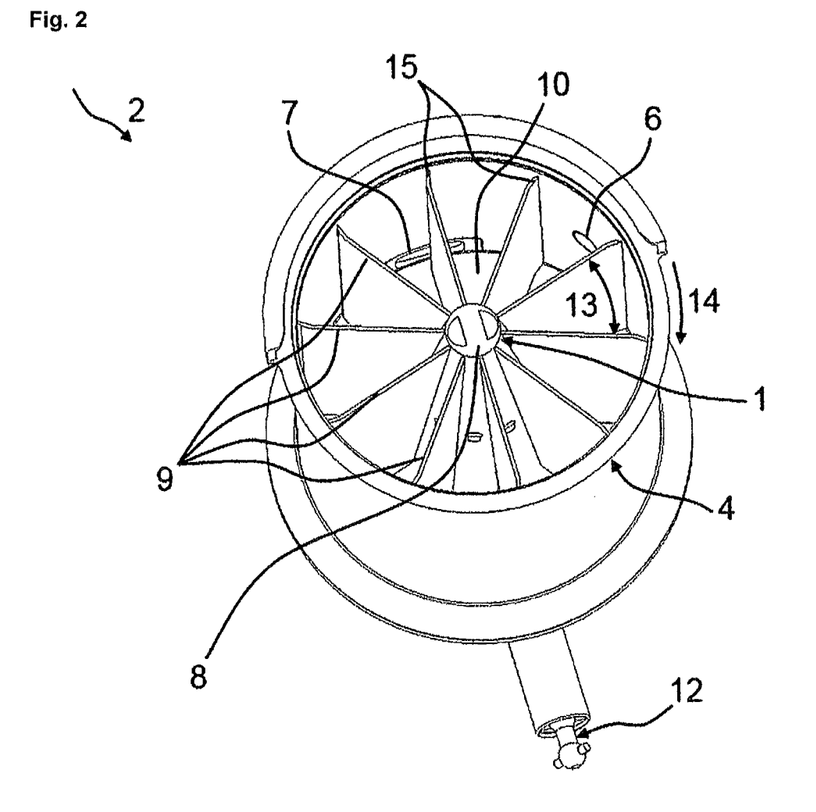

A perspective representation of the fluid-bed apparatus 2, in which the invention-based dryer star 1 is installed, is shown in FIG. 2. The drawing displays the technical features of the star-shaped rotation dryer 1 already mentioned in FIG. 1 as well as the flow-receiving base 10, not shown in FIG. 1. Also displayed is an opening angle 13 of the process compartments 11, formed by the dividing walls 9 arranged around the cone 8 of the star-shaped rotation dryer 1, the flow-receiving base 10, the outer jacket 5 and the cover not shown here, said angle 13 of said compartments 11 being essentially determined by the relative positions of the solid particles inlet unit 6 and the solid particles outlet unit 7 to one another. Said flow-receiving base 10, which is detachably fitted to the invention-based rotating dryer star 1, facilitates a decoupling of the two units, namely the distribution chamber 3 and fluidizing chamber 4. The cone 8 in the rotating dryer star 1, which grows in diameter downward from the here invisible top cover, in direction of the flow-receiving base 10, serves to stabilize the flow, thereby creating a more stable fluidized bed within the fluidizing chamber 4. The dividing walls 9 fitted to the rotating dryer star 1 extend over the whole height of the fluidizing chamber 4 and are therefore high enough to make it impossible for the fluidized solid particles to spill over during operation of the fluid-bed apparatus 2. This characteristic of the dividing walls 9 improves product quality, since it prevents any reverse mixing of solid particles between the separate process compartments 11 where the solids have undergone different conditioning processes. In the exemplary embodiment, the dividing walls 9 additionally each feature, at the outer edges, wall end pieces 15 that are curved or angled in rotating direction, resulting, firstly, in additional mechanical stability of the dividing walls 9 of the star-shaped rotation dryer 1, and, secondly, in sealing off the process compartments 11 against the outer jacket 5. At the same time, the end pieces 15 of the dividing walls 9 that are inclined in rotational direction 14, cause any solid particles adhering to the inner walls of the outer jacket 5 being scraped off, thereby preventing a contamination of the inner walls of the outer jacket 5. The wall end pieces 15 between dividing walls 9 and outer jacket 5 of the fluidizing chamber 4 can be replaced by another form of suitable sealing. Apart from employing a rotating dryer star 1, there is the possibility of firmly fixing the outer jacket 5 to the dividing walls 9 of the invention-based star-shaped rotation dryer 1 and thereby constructing the complete fluidizing chamber 4 as a rotating unit.

Figure 3:
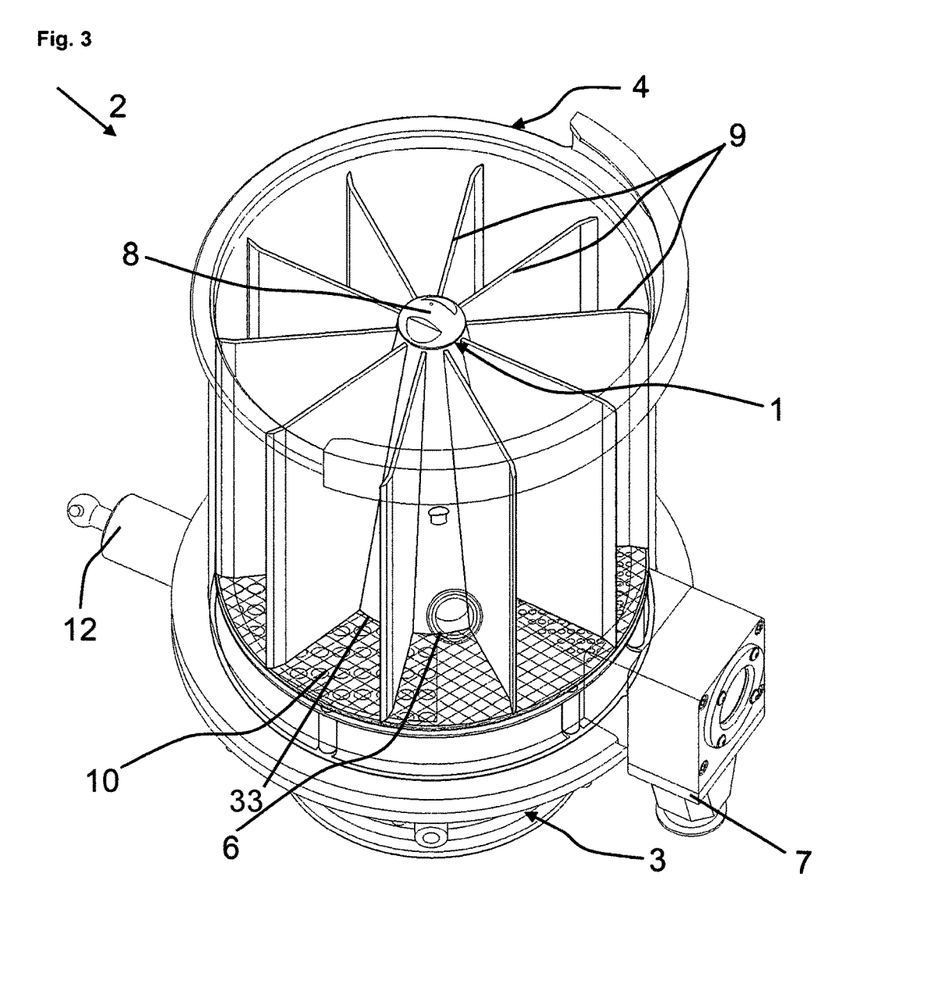
Figure 6:
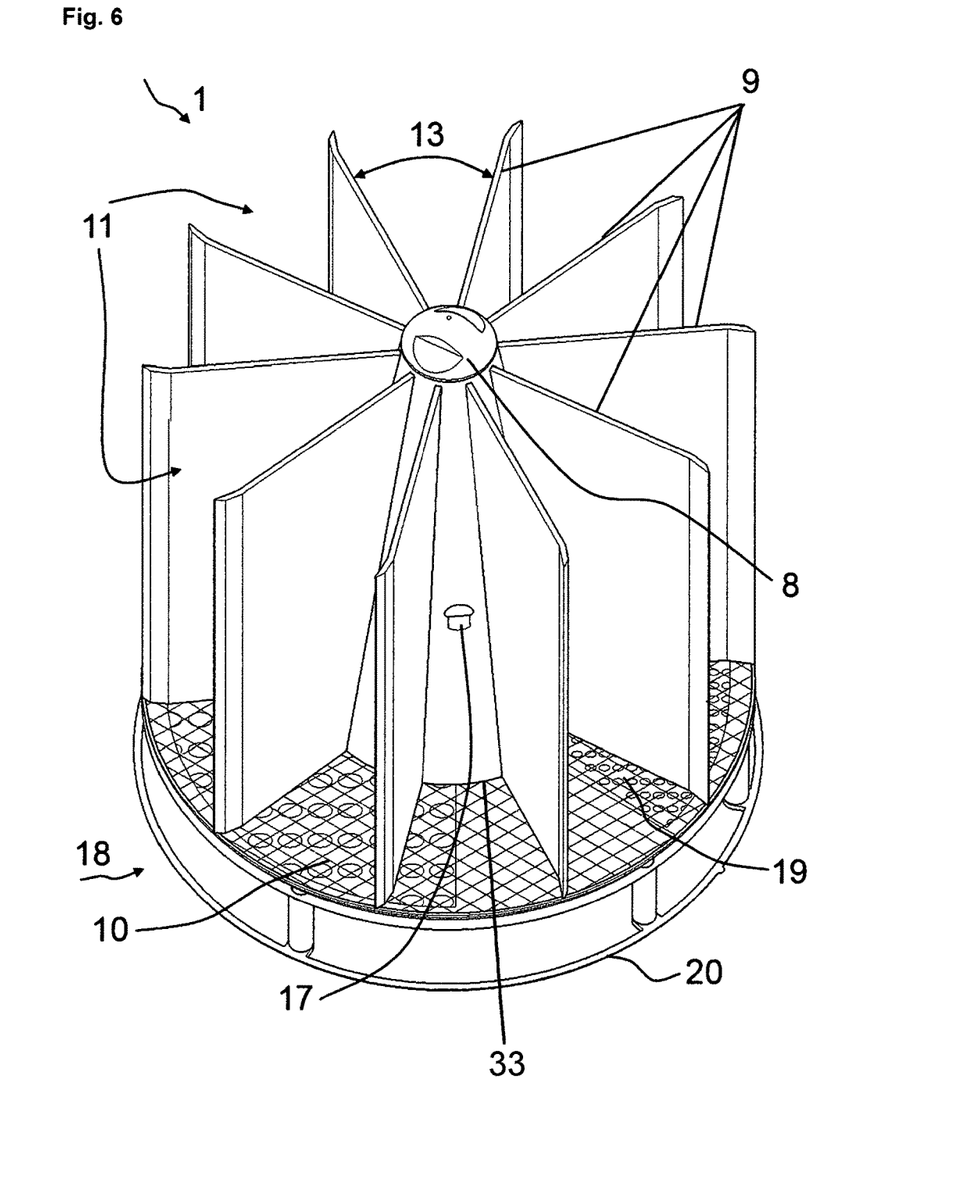
Figure 7:
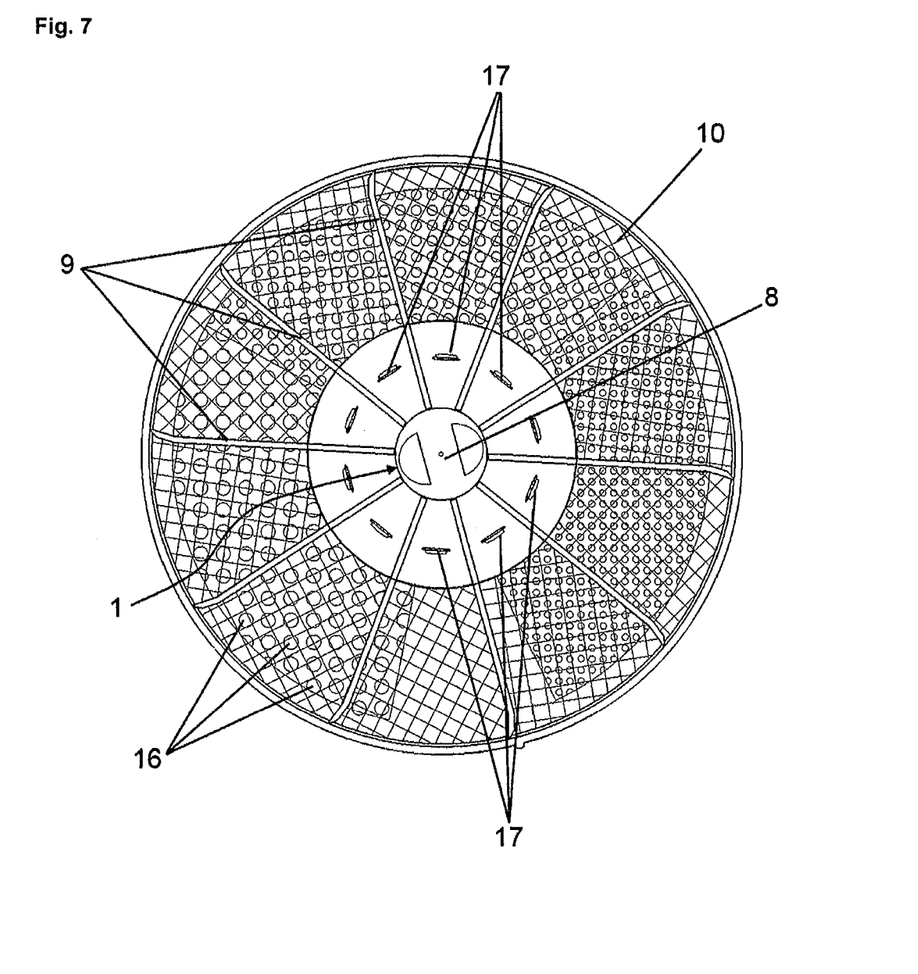
FIG. 7 a top view of the assembly shown in FIG. 6.

FIG. 3 shows a cut-away perspective view of a fluid-bed apparatus 2 with the invention-based star-shaped rotation dryer 1 incorporated therein. In addition to the technical features described above for FIGS. 1 and 2, FIG. 3 clearly displays the flow-receiving base 10, e.g. a grid or similar, of the star-shaped rotation dryer 1 in assembled state of the two function units, i.e. the distribution chamber 3 and the fluidizing chamber 4. The exchangeable flow-receiving base 10, which is pivot mounted to the rotating dryer star 1 so that it rotates with it, features varying opening conditions across its surface. FIGS. 3 and 6 show that the flow-receiving base 10 includes a central conical shaft receiving portion 33 which receives the cone 8 with shape fit. FIGS. 6 and 7 illustrate this as a uniform structure. The opening conditions of the flow-receiving base 10 can be adapted to the solid particles to be conditioned, e.g. by means of varying diameters of the openings 16, which may be designed as bore holes, and in the case of a co-rotating flow-receiving base 10, are adjusted to the smallest dimension of the solid particles to be conditioned. Said adaptation of the flow-receiving base 10 to the smallest solid particles to be conditioned counteracts any loss of products during retention of the solid particles in the fluidizing chamber 4, as they cannot fall through the flow-receiving base. 10. Moreover, the solid particles will not be destroyed since being deposited on the flow-receiving base 10, they cannot be caught by the dividing walls 9. The flow-receiving base 10, e.g. a grid or similar, additionally forms a closure of the process compartment and thereby confines the functioning unit of the fluidizing chamber 4 against the functioning unit of the distribution chamber 3.

Figure 4:
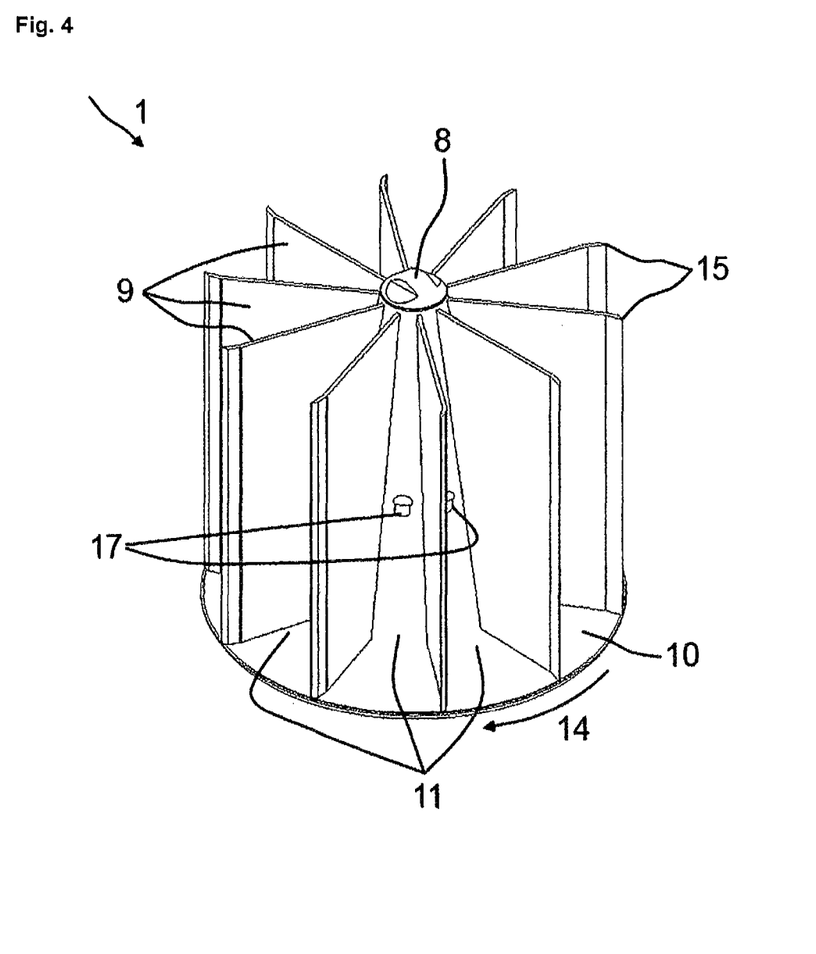

FIG. 4 shows a perspective view of the invention-based star-shaped rotation dryer 1. The star-shaped rotation dryer 1 shown in the exemplary embodiment consists of a cone 8, of the dividing walls 9 with wall end pieces 15 curved in rotational direction 14, and of the detachably mounted flow-receiving base 10, e.g. a grid or similar. Said components form the process compartments 11 where the solid particles are conveyed through the fluidizing chamber 4 with an accurately defined retention time. Also shown are nozzles 17 fitted in the cone 8 of the star-shaped rotation dryer 1. The nozzles may also be fitted to the dividing walls 9 or to the here invisible outer wall 5 of the fluidizing chamber 4. The nozzles facilitate the spray application of different media, such as gases, liquids or solids. Any type of nozzle known from prior art can be employed.

Figure 5:
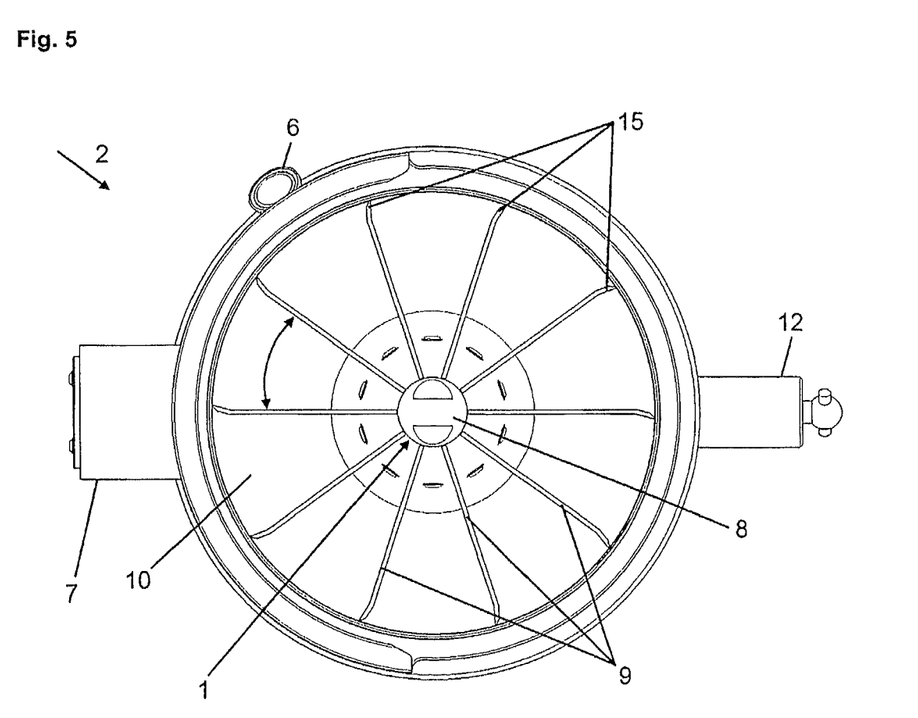

FIG. 5 shows a top view of the invention-based star-shaped rotation dryer 1. The star-shaped rotation dryer 1 shown features the technical characteristics described for FIG. 4 and, in addition, the opening angles 13 that expand the process compartments 11. In the exemplary embodiment, the process compartments 11 all have the same opening angles 13, so that the process compartments 11 are all of identical size. The process compartments 12 may, however, feature differing opening angles 13 and thus not be identical in size. FIG. 5 furthermore shows the downwardly expanding cone 8 of the star-shaped rotation dryer 1, which results in a flow stabilization of the formed fluidized bed.

A perspective representation of the assembly of the invention-based star-shaped rotation dryer 1 with cone 8 and dividing walls 9 is shown in FIG. 6 above a mounting part 18 of the distributor chamber 3 consisting of an air-distributing base 19 and a frame 20. The mounting part 18 is located in the distribution chamber 3 situated below the invention-based star-shaped rotation dryer 1, which in turn is located in the fluidizing chamber 4. Clearly visible in FIG. 6 is the regular distribution of openings in the flow-receiving base 10, here shown as holes 16 in the form of bore holes and designed for the smallest dimensions of the solid particles in the conditioning process to be performed, thereby preventing any product loss.

FIG. 7 displays a top view of the assembly shown in FIG. 6 of the invention-based star-shaped rotation dryer 1 and of the mounting part 18. Previously described technical features, such as dividing walls 9, wall end pieces 15, cone 8 and nozzles 17 are shown again in FIG. 7. In addition, the openings 16 of the flow-receiving base 10 are here shown in a constant configuration as opening bore holes.

Figure 8:
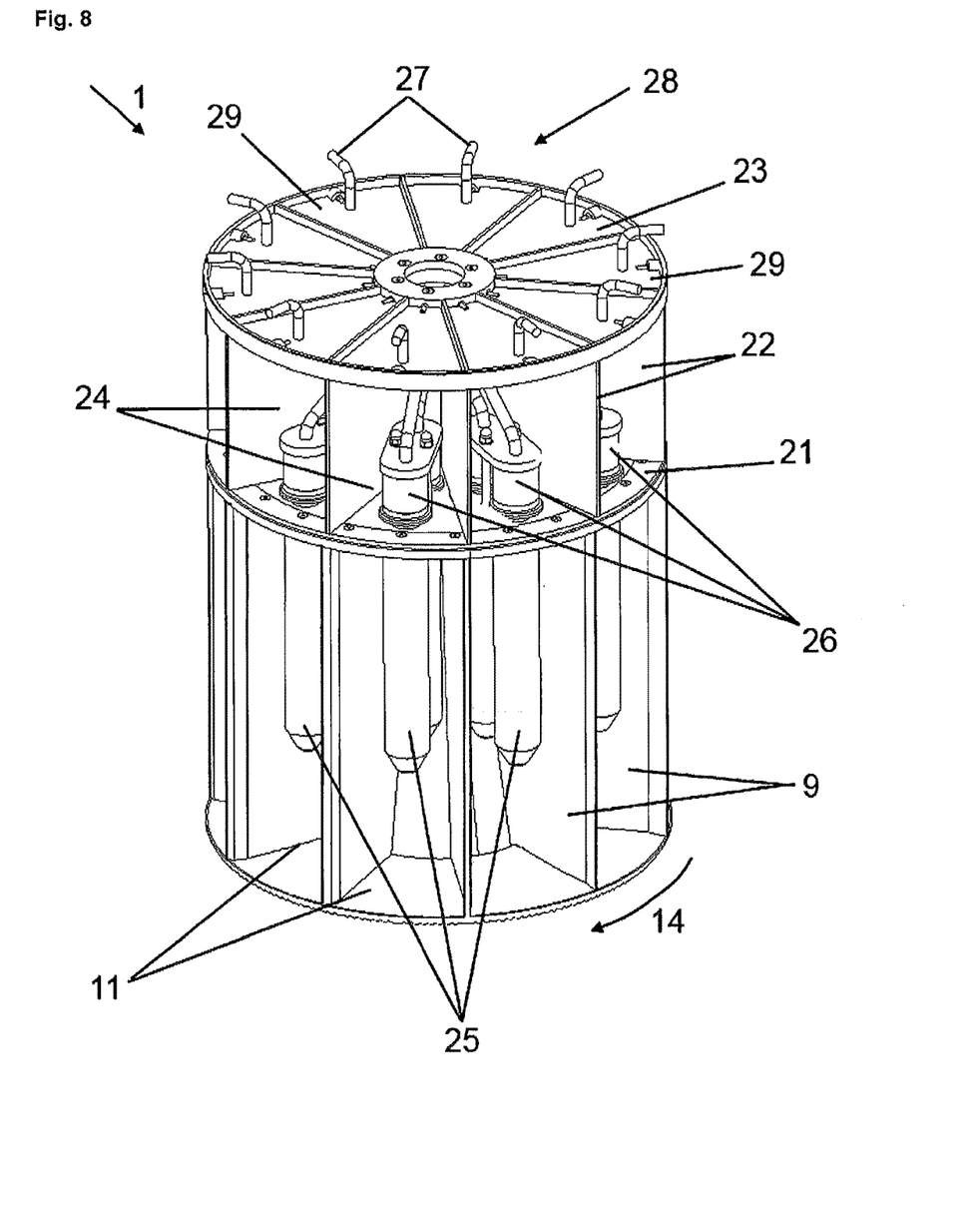
FIG. 8 a perspective representation of the invention-based star-shaped rotation dryer with cover, filters and control unit for the processing gas, and FIG. 9 a cross section of different embodiments of the air inflow facility of fluid-bed apparatuses.

FIG. 8 shows a perspective view of the invention-based star-shaped rotation dryer 1. The process compartments 11 feature at the upper end of the dividing walls 9 a first cover 21 that rotates with the rotating dryer star 1. The cover 21 is connected gas-tight with the dividing walls 9. Because of the cover 21, the height of the process compartments 11 corresponds with the height of the dividing walls 9. Consequently, each process compartment 11 is, on the one hand, cut off from the other process compartment 11 and, on the other hand, the fluidized solid particles will reside in only one process compartment 11 from their entry into the fluid-bed apparatus 2 through the solid particles inlet point 6 to their exit through the solid particles outlet point 7, so that there will be no cross mixing between the various process compartments 11. In the exemplary embodiment, dividing walls 22 are fitted above the cover 21, which walls, as an example, have the same arrangement as the dividing walls 9 of the star-shaped rotation dryer 1, i.e. the dividing walls 22 are aligned with the dividing walls 9 of the star-shaped rotation dryer 1. Like the dividing walls 9 of the process compartments 11, the dividing walls 22 each feature a top cover 23. This likewise rotates with the star-shaped rotation dryer 1 and is at least partially connected with the dividing walls 22, thereby forming filter compartments 24. In the exemplary embodiment, the cover 21 features two opening per process compartment 11, each of which incorporating a filter 25 that may e.g. consist of a woven wire filter cloth or a filtrating weave of fabric or similar, said filter projecting into the respective process compartment 11. Cleaning of the filter 25 is accomplished by means of clocked blasts of air, e.g. pressurised air etc. generated by a filter-cleaning device 26. Said filter cleaning device 26 is supplied with e.g. pressurised air via a feed line 27. Advantageously, at least two filters 25 are provided for each process compartment 11, so that one filter 25 can be cleaned while the processing gas flows through the other filter 25. This ensures a continuous fluidizing process, as the flow of processing gas and thereby the fluidization of the solid particles will not have to be interrupted for cleaning the filter 25. Above the cover 23, a process-gas control unit 28 is depicted, consisting of a butterfly valve 29 or similar for each process compartment 11 and featuring a facility for an interdependent or independent adjustment of the butterfly valves 29 via a technical control input, thereby ensuring a smooth and faultless operation of the fluid-bed apparatus 2. The butterfly valve 29 can be replaced by a control valve fitted in the cover 23. In that case, the cover 23 must be connected to the dividing walls 22 to be gastight, so that each filter compartment 24 is accurately aligned with the corresponding process compartment 11. The position of the butterfly valve or control valve, respectively, determines the flow volume of fluidizing gas (processing gas) that flows through the associated process compartment 11. This facilitates the flow of processing gas to be adjusted or regulated separately for each process compartment 11. When, for example, the solid particles to be fluidized enter a process compartment 11 of the fluid-bed apparatus through the solid particles inlet unit 6, a varying flow of processing gas is required. In the course of the conditioning of the fluidized solid particles, on the other hand, a constant flow of processing gas is required.

Figure 9:
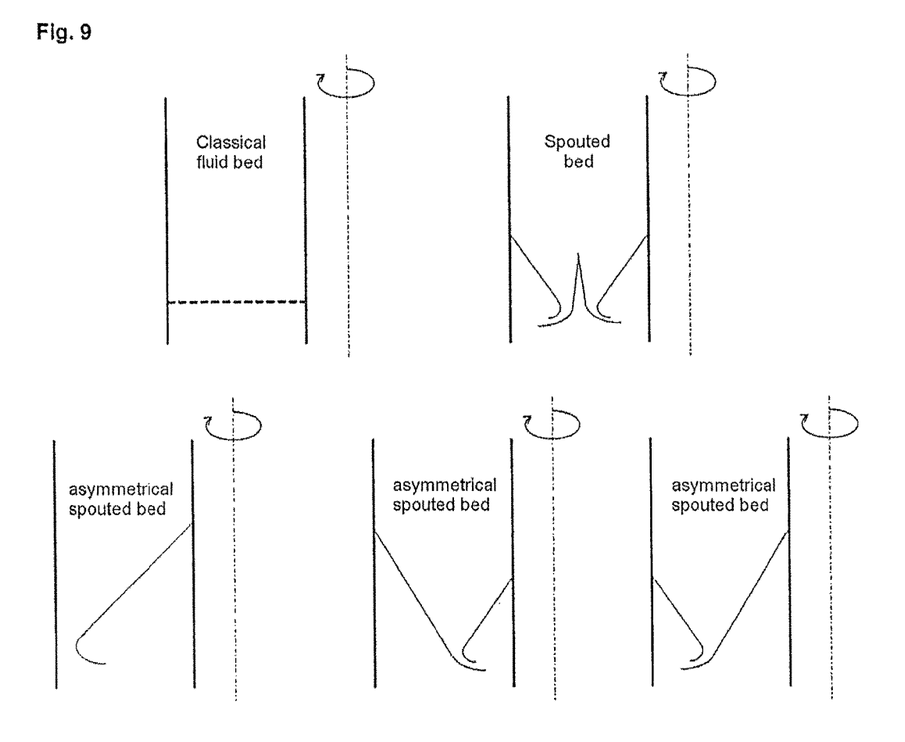

FIG. 9 shows different embodiments of the air inflow facility of fluid-bed apparatuses in a cross section through the individual process compartments of a fluid-bed apparatus. In contrast to classical designs of the flow-receiving bases for fluid-bed apparatuses (perforated, porous, with holes, punched, metal sheets sintered together etc), the air distribution may, instead of through the flow-receiving base, also be effected using the spouted bed principle. This involves the fluidizing agent to be conducted into the process compartment through inlet vents of any design, preferably by vents arranged around the circumference. The purpose-designed configuration thereby facilitates a very broad fluidic working area as well as a targeted manipulation on the particle movement within the process compartments. The design of the air inlet points may be predetermined as "fixed" or as variable and adjustable. The spouted bed may have a symmetrical or an asymmetrical design. The process compartments of the fluid-bed apparatus can have vertical walls or inclined walls of any desired angle, internally and/or externally, to create upwardly widening process compartments. The process compartments, whether designed as classic fluid-bed model or according to the spouted bed principle, can be equipped with all kinds of nozzles and for all types of process variations. Even combinations of spouted beds and fluid beds integrated inside a fluidizing chamber are imaginable.

All the characteristics described here can be significant for the invention, either individually or in any combination.

REGISTER OF REFERENCE NUMBERS

1 Star-shaped rotation dryer
2 Fluid-bed apparatus
3 Distribution chamber
4 Fluidizing chamber
5 Outer jacket
6 Solid particles inlet unit
7 Solid particles outlet unit
8 Cone
9 Dividing wall
10 Flow-receiving base
11 Process compartments
12 Drive unit
13 Opening angle
14 Direction of rotation
15 Dividing wall end piece (sealing)
16 Openings/holes
17 Nozzle
18 Mounting part
19 Air distributor plate
20 Frame
21 Cover
22 Dividing wall
23 Cover
24 Filter compartment
25 Filter
26 Filter cleaning device
27 Feed line
28 Control for processing gas
29 Butterfly valve

The invention claimed is:

1. A dryer device comprising:
    a star-shaped rotation dryer for segmenting a fluidizing chamber into process compartments, whereby the star-shaped rotation dryer comprises a central conical shaft and dividing walls connecting to and protruding from the central conical shaft for the conveyance of solid particles along a conveyance path, and
    a flow-receiving base detachably mounted to the central conical shaft below the star-shaped rotation dryer and with a central conical shaft receiving portion, the central conical shaft receiving portion being shape fit to the central conical shaft,
    wherein the flow-receiving base is pivot-mounted to the star-shaped rotation dryer so that the flow-receiving base rotates with the star-shaped rotation dryer.

2. The dryer device according to claim 1, wherein the flow-receiving base comprises openings, and wherein the size of the openings in the flow-receiving base is dependent on the solid particles to be conditioned.

3. The dryer device according to claim 2, wherein the openings have a size that is dependent on the smallest solid particles occurring in a conditioning process.

4. The dryer device according to claim 1, further comprising at least one nozzle fitted to the star-shaped rotation dryer.

5. The dryer device according to claim 1, further comprising an outer jacket of the fluidizing chamber,
    wherein the dividing walls are fixed as one continuous solid piece to the outer jacket.

6. The dryer device according to claim 1, further comprising at least one cover and/or at least one filter disposed at a top portion of the dividing walls.

7. The dryer device according to claim 6, wherein the minimum of one filter is arranged on the minimum of one cover.

8. The dryer device according to claim 1, further comprising a process gas control unit disposed above the star-shaped rotation dryer.

9. A method for the treatment of solid particles for the purpose of agglomeration, coating, layering, spray granulation or pelletizing in a fluid-bed apparatus in which the solid particles are spray-coated with a specific retention time spectrum being set, comprising
    (a) providing a star-shaped rotation dryer for segmenting a fluidizing chamber into process compartments, wherein the star-shaped rotation dryer is pivot-mounted and comprises a central conical shaft and dividing walls connecting to and protruding from the central conical shaft for the conveyance of solid particles along a conveyance path;
    (b) detachably mounting a flow-receiving base to the central conical shaft below the star-shaped rotation dryer in a manner such that the flow-receiving base rotates with the star-shaped rotation dryer, the flow-receiving base comprising a central conical shaft receiving portion, the central conical shaft receiving portion being shape fit to the central conical shaft;
    (c) spray-coating the solid particles in the star-shaped rotation dryer; and
    (d) conveying the solid particles along the conveyance path;
    wherein the retention time spectrum as a ratio of the solid particles retention time in the fluid-bed apparatus with a 10% cumulative distribution and a 90% cumulative distribution has a margin of at least 1:3.

10. The dryer device according to claim 1, wherein each dividing wall of the dividing walls has an outer end and an end piece at the outer end, the end piece being curved or angled such that the dividing wall is configured to scrape off an inner surface of an outer wall of the fluidizing chamber as the dividing walls rotate and the outer wall remains stationary.

* * * * *